(12) United States Patent
Pendergraft et al.

(10) Patent No.: US 8,249,903 B2
(45) Date of Patent: Aug. 21, 2012

(54) METHOD AND SYSTEM OF DETERMINING AND EVALUATING A BUSINESS RELATIONSHIP NETWORK FOR FORMING BUSINESS RELATIONSHIPS

(75) Inventors: David R. Pendergraft, Mannasas, VA (US); Michael P. Miller, Alexandria, VA (US)

(73) Assignee: Accenture Global Services Limited, Dublin (IE)

( * ) Notice: Subject to any disclaimer, the term of this patent is extended or adjusted under 35 U.S.C. 154(b) by 1245 days.

(21) Appl. No.: 11/545,753

(22) Filed: Oct. 10, 2006

(65) Prior Publication Data
US 2008/0086343 A1  Apr. 10, 2008

(51) Int. Cl.
*G06Q 10/00* (2012.01)
(52) U.S. Cl. .................................. 705/7.11; 705/319
(58) Field of Classification Search .................. 705/7.11, 705/319
See application file for complete search history.

(56) References Cited

U.S. PATENT DOCUMENTS

| | | | |
|---|---|---|---|
| 6,564,209 B1 | 5/2003 | Dempski et al. | |
| 6,697,807 B2 | 2/2004 | McGeachie | |
| 6,957,205 B1 | 10/2005 | Liongosari | |
| 7,016,307 B2 * | 3/2006 | Vasudev et al. | 370/238 |
| 7,047,244 B2 | 5/2006 | McGeachie | |
| 7,076,504 B1 | 7/2006 | Handel et al. | |
| 7,099,854 B2 | 8/2006 | Liongosari | |
| 7,716,140 B1 * | 5/2010 | Nielsen et al. | 705/319 |
| 7,797,732 B2 * | 9/2010 | Tam et al. | 726/3 |
| 7,818,200 B2 * | 10/2010 | Kerschbaum et al. | 705/7.29 |
| 2002/0059201 A1 * | 5/2002 | Work | 707/3 |
| 2004/0122803 A1 * | 6/2004 | Dom et al. | 707/3 |
| 2004/0122855 A1 * | 6/2004 | Ruvolo et al. | 707/104.1 |
| 2004/0148275 A1 * | 7/2004 | Achlioptas | 707/3 |
| 2004/0267729 A1 | 12/2004 | Swaminathan et al. | |
| 2005/0165764 A1 | 7/2005 | Liongosari | |
| 2006/0042483 A1 * | 3/2006 | Work et al. | 101/91 |
| 2006/0179024 A1 | 8/2006 | Bechtel et al. | |
| 2006/0179025 A1 | 8/2006 | Bechtel et al. | |
| 2006/0179026 A1 | 8/2006 | Bechtel et al. | |
| 2006/0179027 A1 | 8/2006 | Bechtel et al. | |

(Continued)

FOREIGN PATENT DOCUMENTS
WO  WO 01/67280  9/2001

OTHER PUBLICATIONS

Tsirigos and Haas, Multipath Routing in the Presence of Frequent Topological Changes, Design Methodologies for adaptive and multimedia networks, IEEE Communications Magazine, Nov. 2001, p. 132-38.*

(Continued)

*Primary Examiner* — Justin M Pats
(74) *Attorney, Agent, or Firm* — Mannava & Kang, P.C.

(57) ABSTRACT

A collective knowledge set of business relationship information from a plurality of sources is generated. The collective knowledge set is mapped as a plurality of navigable paths forming a business relationship network between a source and a target. One or more of the paths are identified as candidate paths most likely to lead to a business relationship between the source and the target based on evaluation criteria.

30 Claims, 15 Drawing Sheets

U.S. PATENT DOCUMENTS

2006/0179067 A1    8/2006   Bechtel et al.
2006/0179069 A1    8/2006   Bechtel et al.
2006/0248573 A1*  11/2006   Pannu et al. .................... 726/1
2007/0136429 A1*   6/2007   Fine et al. .................... 709/206
2009/0018918 A1*   1/2009   Moneypenny et al. ......... 705/14
2009/0055476 A1*   2/2009   Markus et al. ................ 709/204
2009/0144075 A1*   6/2009   Flinn et al. ....................... 705/1
2009/0319466 A1*  12/2009   Liu et al. ........................ 706/54
2010/0180032 A1*   7/2010   Lunt ............................. 709/225

OTHER PUBLICATIONS

Kautz and Selman, Creating Models of Real-World Communities with ReferralWeb, http://www.cs.washington.edu/homes/Kautz/talks/rec98talk.ppt, 1998, p. 1-38.*

Pujol et al., Extracting Reputation in Multi Agent Systems by Means of Social Network Topology, AAMAS '02, Jul. 15-19, 2002, Bologna, Italy, p. 1-8.*

* cited by examiner

REFINED DATA SET 400

| SOURCE COMPANY | LINK ATTRIBUTES FOR SOURCE COMPANY | TARGET COMPANY | LINK ATTRIBUTES FOR TARGET COMPANY | MATCHING LINK ATTRIBUTES |
|---|---|---|---|---|
| JOHN | COLLEGE ALUMNUS, GOLF CHURCH MEMBER, CHURCH | BOB | IT MANAGER, COLLEGE ALUMNUS | ALUMNI OF SAME COLLEGE |
| MARY | CHARITY, COLLEGE ALUMNUS | ALICE | BOARD MEMBER OF CHARITY | BOARD MEMBER OF SAME CHARITY |

↗ 401 (John row)
↗ 402 (Mary row)

*FIG. 4*

METHOD AND SYSTEM OF DETERMINING AND EVALUATING A BUSINESS RELATIONSHIP NETWORK FOR FORMING BUSINESS RELATIONSHIPS

BACKGROUND

Currently, it is difficult to identify useful relationships that employees may have with current or prospective clients and to identify relationships which can be used to further business development objectives. These business relationships may be essential to the sales process and for developing the prospective client into a client.

Current tools for business development typically include storing contact information for current and prospective clients. It is generally up to the user to review the contact list and determine whether any of the contacts may be helpful in developing new business relationships that can lead to new sales. However, typically users focus on one-to-one relationships, such as whether anyone in their contact list works for a company that is a prospective client. However, developing a business relationship with a client may require fostering relationships with two or three intermediate people, and it is a difficult and time consuming task to identify these intermediate people from a contact list.

Furthermore, typically contact list are limited by organizational level, geographically limited, or may not be focused lists. For example, a user may rely only on relationships with high-level employees, such as board members, to generate a business relationship with a prospective client, but many business relationships may result from relationships with lower-level employees. Also, a contact list may be generated from sources from the same office and may not consider lucrative information from affiliates or other sources located in other geographic areas. Also, some approaches to business development include mass mailings or cold calling based on purchased contact list, which is highly inefficient and costly.

In addition, it may be difficult to harvest business relationship information from multiple sources for the contact list due to data confidentiality or other obstacles. Furthermore, people may be unaware of the importance of their existing relationships with friends or other people simply because they may not know that these people work for a potential client or are somehow connected to the potential client. Thus, it is difficult to collect information that may be useful for identifying relationships which can be used to further business development objectives. Also, even with some useful business relationship information collected, current tools and approaches that may use the collected information for business development tend to be ineffective, time-consuming and costly.

SUMMARY

According to an embodiment, a business relationship network for developing business relationships is automatically generated. A collective knowledge set of business relationship information from a plurality of sources is generated. The collective knowledge set is mapped as a plurality of navigable paths forming a business relationship network between a source and a target. One or more of the paths are identified as candidate paths most likely to lead to a business relationship between the source and the target based on an evaluation criteria formed from business objectives.

BRIEF DESCRIPTION OF THE DRAWINGS

The embodiments are illustrated by way of example and without limitation in the accompanying figures in which like numeral references refer to like elements, and wherein:

FIG. 4 illustrates an example of data in a refined data set for matching link attributes, according to an embodiment;

DETAILED DESCRIPTION

Figure 1:
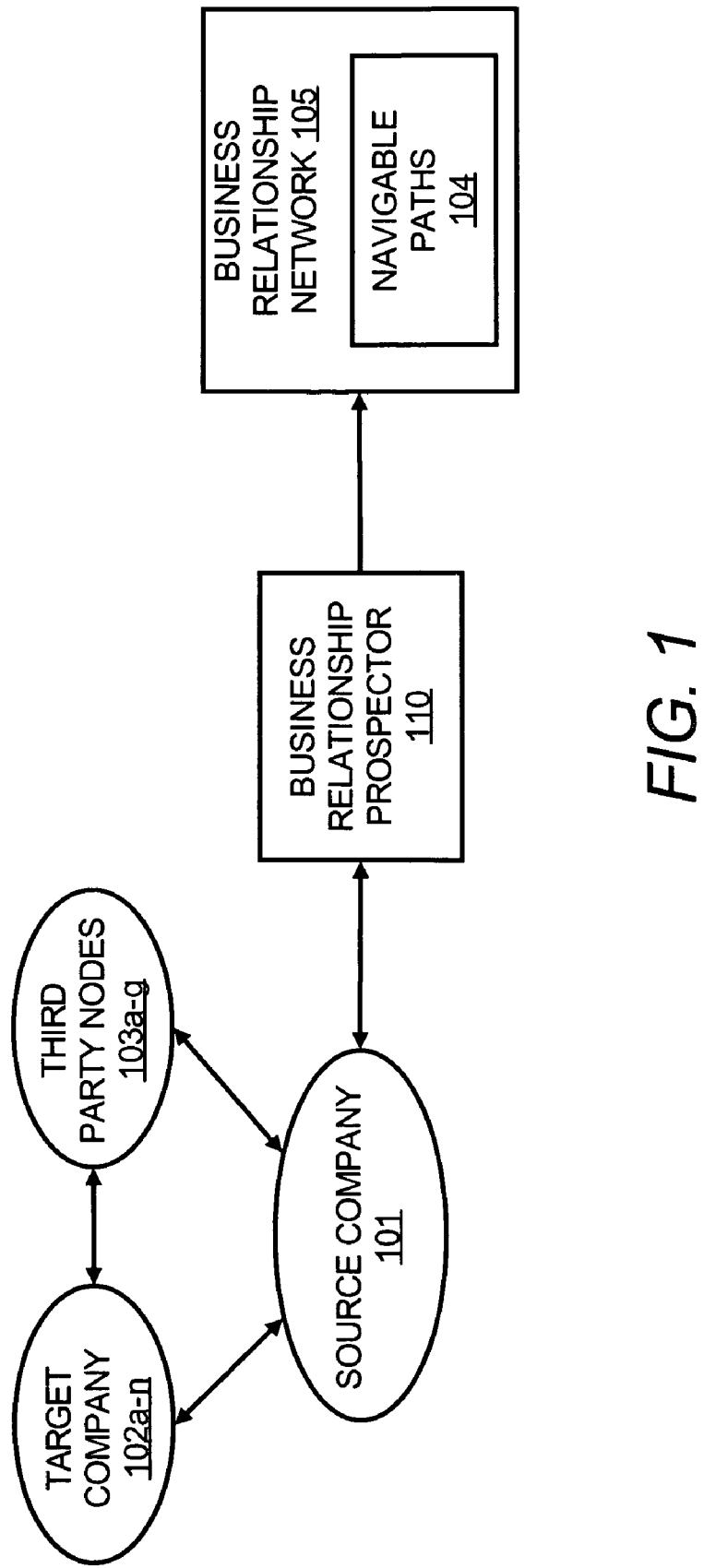
FIG. 1 illustrates a block diagram of a system, according to an embodiment.

For simplicity and illustrative purposes, in the following description embodiments of systems and methods are described, and numerous specific details are set forth in order to provide a thorough understanding of the embodiments. It will be apparent however, to one of ordinary skill in the art, that the embodiments may be practiced without limitation to these specific details. In other instances, well known methods and structures are not described in detail so as not to unnecessarily obscure understanding of the embodiments.

According to an embodiment a business relationship network between a target and a source is automatically determined from a collective knowledge set of business relationship information. The business relationship network may include a plurality of navigable paths that can be followed to develop business relationships to further business objectives, such as understanding client's needs, setting up meetings with key decision-makers, generating and identifying new opportunities for sales, increasing the probabilities of winning business proposals, increasing a return on investment or for achieving other business objectives.

A business relationship is a relationship that may be used to further the needs or objectives of a business entity. A business relationship may include a relationship between a source and a target. Examples of types of sources and targets include but are not limited to business entities, such as companies, individuals, groups, or other entities that may be leveraged to generate business relationships. In one example, the source is a company that is interested in doing business with a target company. The target may also include existing customers or clients of the source.

Business relationships may include direct or indirect business relationships. A direct business relationship is a business relationship between a source and a target without any intervening third party nodes between the source and the target. For example, Rich of a source company A knows the individual at a target company B that decides whether to purchase goods or services from the source company A.

An indirect business relationship is a business relationship that includes at least one third party node between the source and the target. Third party nodes are individuals or entities that are intermediate to a target and a source in a business relationship. In some instances, a third party node may include an event or a place. Indirect business relationships have "n" degrees of separation where "n" is the number of third party nodes between the source and the target.

According to an embodiment, a target, a source and third party nodes connecting the target and the source are identified and used to create a business network. The business network includes multiple navigable paths from one node to another node in the network. Each node may represent a person, an entity or a group, such as a corporation, affiliates, charity, organization, or an event or place. Each navigable path is a logical path that can be followed from one node in the path to another node in the path to achieve a business objective, such as developing a business relationship between the source and the target. For example, the navigable paths include paths between a source node, such as a source company, and a target node, such as a target company. The navigable paths may include multiple links. Each link may be provided between two nodes in a navigable path and represents a relationship between the two nodes. At least some of the paths may represent indirect business relationships between the source company and the target company, and include one or more intervening third party nodes between the source and the target node. A navigable path may also represent a direct business relationship without third party nodes.

The navigable paths in the business network may be evaluated to identify one or more candidate navigable paths that are determined to have a greatest likelihood of generating a business relationship. Evaluation criteria may be used to select the candidate navigable paths. Evaluation criteria may be static or dynamic. For example, static evaluation criteria may characterize paths as first tier, second tier, or third tier, based on predetermined attributes of intervening nodes. Each tier is representative of an estimated level of ability to develop a business relationship network from navigable paths to be placed in the tier. The tiers may be ranked or weighted based on the estimated strength of the navigable paths to develop a business relationship network. The tiers may be used to select or highlight the best candidate paths for generating a business relationship network. Dynamic criteria may be generated based on feedback, which includes evaluating navigable paths from previously-generated business networks. For example, navigable paths that resulted in generating business relationships or resulted in achieving another business objective are identified and any third party nodes in those paths and attributes of those nodes are identified. This information may be used to select future candidate navigable paths and to modify a framework for collecting data to generate business networks. Dynamic criteria may also be used to characterize nodes or navigable paths in tiers.

FIG. 1 illustrates a system 100 for determining a business relationship network 105. A source, such as the source company 101 is interested in targets, such as the target companies 102a-n. A business relationship prospector 110 determines a business relationship network 105, including navigable paths 104, between the source company 101 and the target companies 102a-n from information from a plurality of sources. For example, the source company 101 provides information about itself, information about the target companies 102a-n, and information about third party nodes 103a-g to the business relationship prospector 110. Information from other sources may also be gathered. One or more of the third party nodes 103a-g may provide or exchange business relationship information with one or more of the target companies 102a-n. Other sources may be used to gather information on the source company 101, information about the target companies 102a-n, and information about third party nodes 103a-g. Other sources may include public or private databases or services gathering and providing business relationship information.

The information about the source company 101 provided to the business relationship prospector 110, for example, includes a list of employees and link attributes for the employees. Link attributes include information about an employee that can be used to link the employee to a target. This may include associations with the third party nodes 103a-g, familial information related to business, and any other information that may be relevant to identifying a business relationship. The source company 101 also provides a list of the target companies 102a-n and the third party nodes 103a-g to the business relationship prospector 110. The business relationship prospector 110 uses the source company information and the information about the target companies 102a-n and the third party nodes 103a-g to generate the business relationship network 105 and to identify the potential via navigable paths 104. Link attributes may also be collected for the target companies 102a-n and the third party nodes 103a-g. Also, third party nodes may be identified from information collected from sources other than the source company 101.

Figure 2:
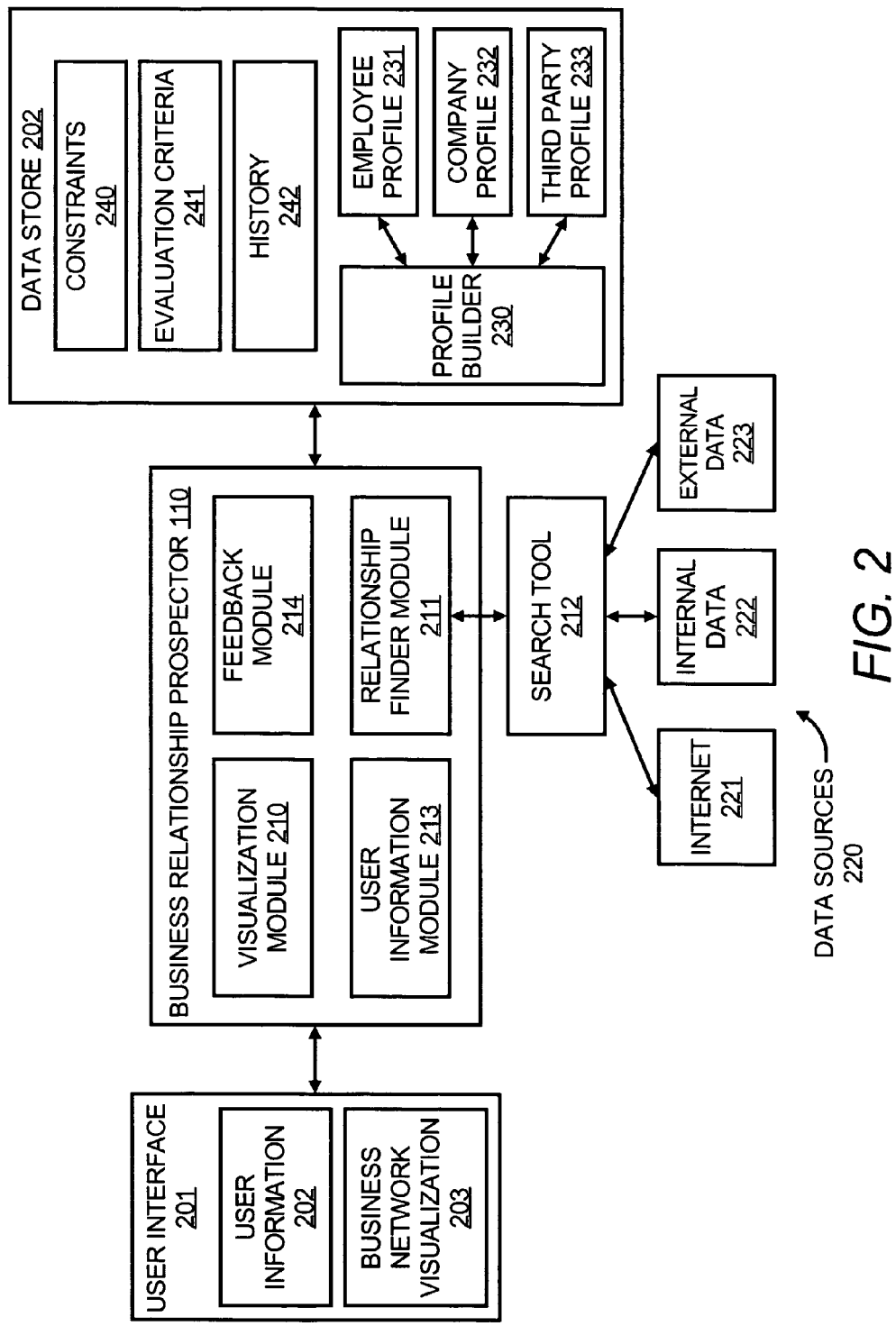
FIG. 2 illustrates a more detailed block diagram of the system shown in FIG. 1, according to an embodiment.

FIG. 2 illustrates a more detailed diagram of the system 100, according to an embodiment. The system 100 comprises a user interface 201, the business relationship prospector 110, and a data store 202. The user interface 201 may include one or more devices for entering information and receiving information. A user may enter user information 202 via the user interface 201. The user information 202 may include search guidance components, such as one or more targets, constraints for searching for business relationship information used to generate a business relationship network for a target, and any other information that is useful for identifying business relationship information used to generate a business relationship network. For example, a user from the source company 101 may input a list of target companies, such as the target companies 102a-n shown in FIG. 1 and information for the third party nodes 103a-g and employees at the source company 101. This information may be used to generate a business relationship network for each of the target companies 102a-n.

Constraints are used to focus the search for business relationship information. For example, a constraint may include identifying business relationships only with employees of a target company that have the authority to purchase or influence the purchase of goods or services provided by a source company. Another example of a constraint is the maximum number of degrees of separation that may be used to identify a business relationship. For example, in many instances, the larger the value of "n" for n-degrees of separation, the less likely a business relationship will be able to be established that will achieve a business objective, such as making a sale. The constraints may be entered via the user interface 201 and stored in the data store 202 as the constraints 240.

Other examples of the constraints 240 may include constraints for searching the data sources 220 and constraints for generating a business relationship network. For example, a constraint may include generating business relationship networks only identifying potential business relationships with C-suite executives of the target company 102a and employees of the source company 101 shown in FIG. 1. Examples of C-suite executives include chief executive officers, chief financial officers, chief technical officers, etc. In another example, a constraint may exclude certain information from being used to generate a business relationship network. For example, privacy laws or internal, company, privacy policies may require that certain employee information be kept confidential, and thus may not be used for determining business relationships. Another example of a constraint may be a geographic constraint. For example, a geographic constraint limits the search to employees of the target company 102a in the greater Washington D.C. area. The constraints 111 may be provided by the source company 101 requesting the determination of the business relationship network 105. The business relationship prospector 110 may generate business relationship networks taking into consideration the constraints 240.

The user interface 201 may also be used to output a business network visualization 203 which is further described with respect to FIGS. 3-7. The business network visualization 203 is a visualization of the business network that can quickly be used to identify navigable paths in the business network. These navigable paths may be used as a guide to generate business relationships. The user interface 201 may also be used to output other information, such as updates of business networks based on newly collected information or other business relationship information.

The search tool 212 performs a global search on the data sources 220 to identify business relationship information, which may include any information that may be pertinent to business relationships between a source and a target. For example, the search tool 212 searches the data sources 220 for information on the source company 101, the third party nodes 103a-g and the target companies 102a-n shown in FIG. 1. A collective knowledge set of business relationship information is retrieved from the data sources 220 and stored in the data store 202. The business relationship prospector 110 uses the collective knowledge set of business relationship information to generate business relationship networks, as described in further detail below.

Conventionally, a user may use a single source, such as their personal contact list, to contact people to form business relationships. However, the information in the user's personal contact list is typically a very limited amount of information, and many opportunities for forming valuable business relationships may be missed by relying solely or heavily on the user's personal contact list. According to an embodiment, the collective knowledge set may include business relationship information from many different sources as opposed to a single source to generate a more complete business relationship network between a source and a target.

The global search performed by the search tool 130 may be a comprehensive search for any information that may be used to determine the navigable paths 104 between the source company 101 and the target companies 102a-n. However, the global searches may be constrained, for example, based on the constraints 240. For example, the global search may be limited to employees at the target companies 102a-n that have authority to make or influence purchasing decisions or may be limited to identify information for indirect business relationships that only include certain third party nodes that have been previously determined to be successful for generating business relationships. Other types of constraints may also be used.

The business relationship prospector 110 may guide the search tool 212 to perform the global search. For example, the source company 101 sends information associated with the source company 101, such as lists of employees, lists of board members, company or division names, subsidiaries, etc., a list of the target companies 102a-n, a list of third party nodes 103a-g, link attributes, and any other information that may be helpful for identifying the navigable paths 104. The business relationship prospector 110 generates a query from the information received from the source company 101 and sends the query to the search tool 212. The business relationship prospector 110 may organize and filter the information received from the source company 101 before sending the information to the search tool 212. For example, the information determined to be most relevant for identifying business relationships is identified and sent to the search tool 212 for searching the data sources 220. Global searches may be periodically performed to continually update the data store 202 with new business relationship information that may be used to determine business networks and business relationships. The search tool 212 may include a conventional search tool, such as a web crawler or text search tool. In one embodiment, the search tool 212 is a knowledge discovery tool described in U.S. patent application Ser. No. 11/051,745, entitled "Knowledge Discovery Tool Relationship Generator" and U.S. patent application Ser. No. 11/051,733, entitled "Knowledge Discovery Tool Extraction and Integration", both of which are by Bechtel et al. and both of which are incorporated by reference in their entireties. For example, the search tool 212 may extract data from multiple sources and/or organize and store extracted data in a relational database, such as performed by the knowledge discovery tool described in the aforementioned patent applications incorporated by reference.

The data sources 220 may include one or more internal data sources 222, such as company databases including employee information or client lists for the source company 101, or external data sources 223, such as information on the Internet 221 or external commercial databases. The internal data and the external data may be structured or unstructured. Internal databases or external commercial databases that provide business-related information are examples of structured data, such as lists of board of directors, executives, etc. Unstructured data may include information retrieved from the Internet, such as news articles providing information on the target or the source, information listed on web sites related to the target or source or third party nodes, etc.

The data store 202 stores the business relationship information retrieved from the data sources 220. The business relationship information may be organized as profiles by a profile builder 230. FIG. 2 shows examples of types of profiles stored in the data store 202, such as employee profiles 231, company profiles 232 and third party profiles 233. Other types of profiles may also be stored. Each profile may include link attributes and these link attributes are used to create business relationship networks.

Also, the constraints 240 and evaluation criteria 241 may be stored in the data store 202. The evaluation criteria 241 may include criteria for evaluating business relationship networks and selecting candidate navigable paths in a business relationship network that are likely to result in business relationships. The evaluation criteria may be used to weight candidate paths as an estimate of the probability that a navigable path can generate a business relationship or can be used to achieve another business objective. The evaluation criteria 241 may be static or dynamic. For example, static evaluation criteria may characterize paths as first tier, second tier, or third tier, based on predetermined attributes of third party nodes in the paths. Dynamic criteria may be generated based on feedback, which includes evaluating navigable paths from previously-generated business networks. For example, navigable paths that resulted in generating business relationships or resulted in achieving another business objective are identified and any third party nodes in those paths and attributes of those nodes are identified. This information may be used to select future candidate navigable paths that are likely to generate a business relationship or achieve a business objective.

In addition, a history 242 may be stored in the data store 202. The history 242 includes information regarding successes or failures of using previously-generated business relationship networks to generate business relationships.

The business relationship prospector 110 includes a visualization module 210, a relationship finder module 211, a user information module 213, and a feedback module 214. A module may include only software, only hardware or a combination of hardware and software. As described above, the business relationship prospector 110 may guide the search tool 212 to perform the global search. For example, the relationship finder module 211 of the business relationship prospector 110 guides the search tool 212. The relationship finder module 211 may organize and filter information received from a user, such as targets, third party node attributes, and other information relevant to the targets and the source, and use this information to generate a query for the search tool 212 to perform the global search. Queries for the global search may be periodically updated and executed. The business relationship information retrieved from the data sources 220 as the search results may be stored in the data store 202.

The relationship finder module 211 may also generate a business relationship network by mapping the business relationship information stored in the data store 202 as a plurality of navigable paths forming the business relationship network between a source and a target. For example, the relationship finder module 211 searches the business relationship information stored in the data store 202, including the profiles 231-233, for information associated with business relationships between the source company 101, the target companies 102a-n and the third party nodes 103a-g which link the source company 101 to the target companies 102a-n. The information retrieved from the data store 202 is mapped to navigable paths. For example, link attributes in the profiles 231-233 are matched to identify navigable paths between the source company 101 and the target companies 102a-c. The navigable paths form the business relationship network 105 shown in FIG. 1 between the source company 101 and the target companies 102a-c. Examples of mapping are further described with respect to FIG. 3. Also, any constraints on generating the business relationship network 105 in the constraints 240 are considered when performing the mapping.

The relationship finder module 211 may also evaluate the navigable paths to identify one or more of the paths as candidate paths most likely to lead to a business relationship between the source and the target based on the evaluation criteria 241. Examples of evaluation criteria may include whether a navigable path includes a third party node that was successfully used to generate a business relationships, whether the value of "n" for n-degrees of separation is less than or equal to a predetermined threshold, whether the navigable path includes a key-decision maker or a C-suite executive, etc. The navigable paths may be classified in tiers based on the evaluation criteria. For example, paths in the highest tier may be candidate paths. In one embodiment, each node or link in a path is classified to a tier based on attributes of the node or nodes connecting a link, and the navigable path is assigned to the tier of the node or link in the path having the lowest tier. So if all the nodes or links in a navigable path are tier 2 except for one node or link being in tier 3, the navigable path is assigned to tier 3. In another example, the tier assignment for a navigable path may be based on the order of the links and their tier values. For example, if the first link closest to the source node is tier 1 and the last link is tier 1, but a middle link is tier 3, then the navigable path may be assigned tier 1, because there is a strong likelihood that the first link is the most significant relationship to be successfully used to form a business relationship with the target. The feedback module 214 may be used to determine some of the evaluation criteria 241 used to identify candidate paths and classify navigable paths to tiers. Other methods may be used to assign a navigable path to a tier.

Also, scoring may be used to assign navigable paths to tiers. For example, a score may be assigned to each link in a navigable path and/or an entire navigable path based on the evaluation criteria. Predetermined ranges of scores are assigned to different tiers. The tiers and scores are representative of a weighting of the ability to use each navigable path to successfully achieve a business objective.

The feedback module 214 in the business relationship prospector 110 may evaluate navigable paths from previously-generated business networks to identify information that may be used to identify navigable paths which are the best candidates to increase the likelihood that a navigable path may be used to generate a business relationship between the source and the target. For example, navigable paths that resulted in generating business relationships or resulted in achieving another business objective are identified through feedback. The information concerning the best candidate paths including the links, third party nodes, attributes, and any other pertinent information is used to select the best candidate paths while developing future business relationship networks. This information may be used to develop or modify the evaluation criteria 241 for selecting future candidate navigable paths. Information regarding whether navigable paths in previously-generated business networks were successful or unsuccessful may be provided by users or automatically determined and stored as the history 242. The feedback module 214 may identify link attributes, information regarding source nodes, links, also referred to as segments, third party nodes, and target nodes for successful or unsuccessful navigable paths. This information may be used in the evaluation criteria 241 or known statistical analysis may be performed on the information to determine the evaluation criteria 241. For example, the number of times a specific third party node was successful or unsuccessful for business development or the number of degrees of separation for successful business relationships are determined and used as evaluation criteria for evaluating future candidate paths.

Based on an evaluation of previously generated business relationship networks and the successes or failures of navigable paths in those networks, the feedback module 214 may identify attributes for placing third party nodes and other nodes in different tiers. For example, third party nodes from successful navigable paths are placed in a higher tier. Some third party nodes may be labeled as unsuccessful if they were repeatedly unsuccessful in generating a business relationship or achieving specified business objectives. These third party nodes may be avoided or placed in a lower tier. Also, third party nodes that have high target participation are identified. This may include identifying third party nodes that have many members which are employees or high-level employees from the target. In another example, based on an evaluation of previously generated business relationship networks and the successes or failures of navigable paths in those networks, the feedback module 214 determines that at least three navigable paths should be tried to generate a business relationship with the target. This information may be presented to the user via the user information module 213 and the user interface 201. The feedback module 214 may update or generate evaluation criteria for the evaluation criteria 241 to reflect the feedback and identified attributes of nodes.

The business relationship prospector 110 may use the analysis of the history 242 performed by the feedback module 214 to determine business guidance points. The user information module 213 may notify the user of the business guidance points via the user interface 201, such that the user is operable to follow the business guidance points to further a business objective. Business guidance points are business heuristics or other information determined from feedback, which may be used to determine, select or create business relationships to achieve business objective. Examples of business guidance points may include identification and notification of high target participation third party nodes or third party nodes that have been successful or unsuccessful for generating business relationships. The user may use this information to identify third party nodes to join or to contact, or to identify third party nodes not to join or not to otherwise pursue. Similar information may be gathered for source nodes and target nodes to determine whether these nodes can be used to successfully generate a business relationship. In another example, the user information module 213 may notify the user that at least three navigable paths should be tried to achieve at least a predetermined percentage of success for generating a business relationship or business outcome with the target. For example, based on statistical analysis of the history 242, the feedback module 213 determines that at least three navigable paths should be followed to have at least a 50% chance of successfully generating a business relationship with the target.

In addition to the information from the feedback module 214, the user information module 213 may also provide guidance to a user for information needed to collect business relationship information. For example, the user information module 213 may request information about predetermined attributes of employees of the target company and potential third party nodes. The predetermined attributes may be helpful in identifying third party nodes that can be used in navigable paths. Also, the feedback module 214 may determine the information for guiding the user based on an evaluation of previously generated business relationship networks and the successes or failures of navigable paths in those networks.

The visualization module 210 generates the business network visualization 201, which is a visual representation of the business relationships network for the source and the target. The visualization module 210 generates the business network visualization 201 from the mappings determined by the relationship finder module 211. The relationship finder module 211 maps the business relationship information stored in the data store 202 as a plurality of navigable paths forming the business relationship network. In one embodiment, the mappings are determined by matching link attributes for the sources, the target and third party nodes. The mappings are used to form the navigable paths which are represented in the business network visualization 201. The navigable paths may include paths for direct and indirect business relationships. The visual representation may be used to quickly identify the navigable paths for forming the business relationships.

FIGS. 3A-D illustrate examples of navigable paths in a business relationship network between the source company 101 and the target company 102a. FIG. 3 also represents an example of visualizations generated by the visualization module 203 shown in FIG. 2.

The source company 101 provides user information to the business relationship prospector 110 shown in FIG. 2. For example, the source company 101 provides the user information 202 to the business relationship prospector 110 via the user interface 201. The user information 202 may include one or more targets, constraints for searching for business relationship information used to generate a business relationship network for a target, information for the third party nodes 103a-g and for the source company 101, and any other information that is useful for identifying business relationship information used to generate the business relationship network 105. For example, the user information 202 may include a list of employees for the source company 101 and link attributes for the employees. The global searches of internal databases and other data sources may have also identified the link attributes for the employees. The link attributes for the employees may be stored in employee profiles. The global searches and/or information provided by the source company 101 may also identify information about the target company 102a and the third party nodes 103a-b. Profiles for the third party nodes 103a-b and the target company 102a may also be compiled from the global searches and/or information provided by the source company 101 and stored in the data store 202. The information from the source company 101, the global searches and other sources form the collective knowledge set for determining the business relationship network between the source company 101 and the target company 102.

Figure 3A:
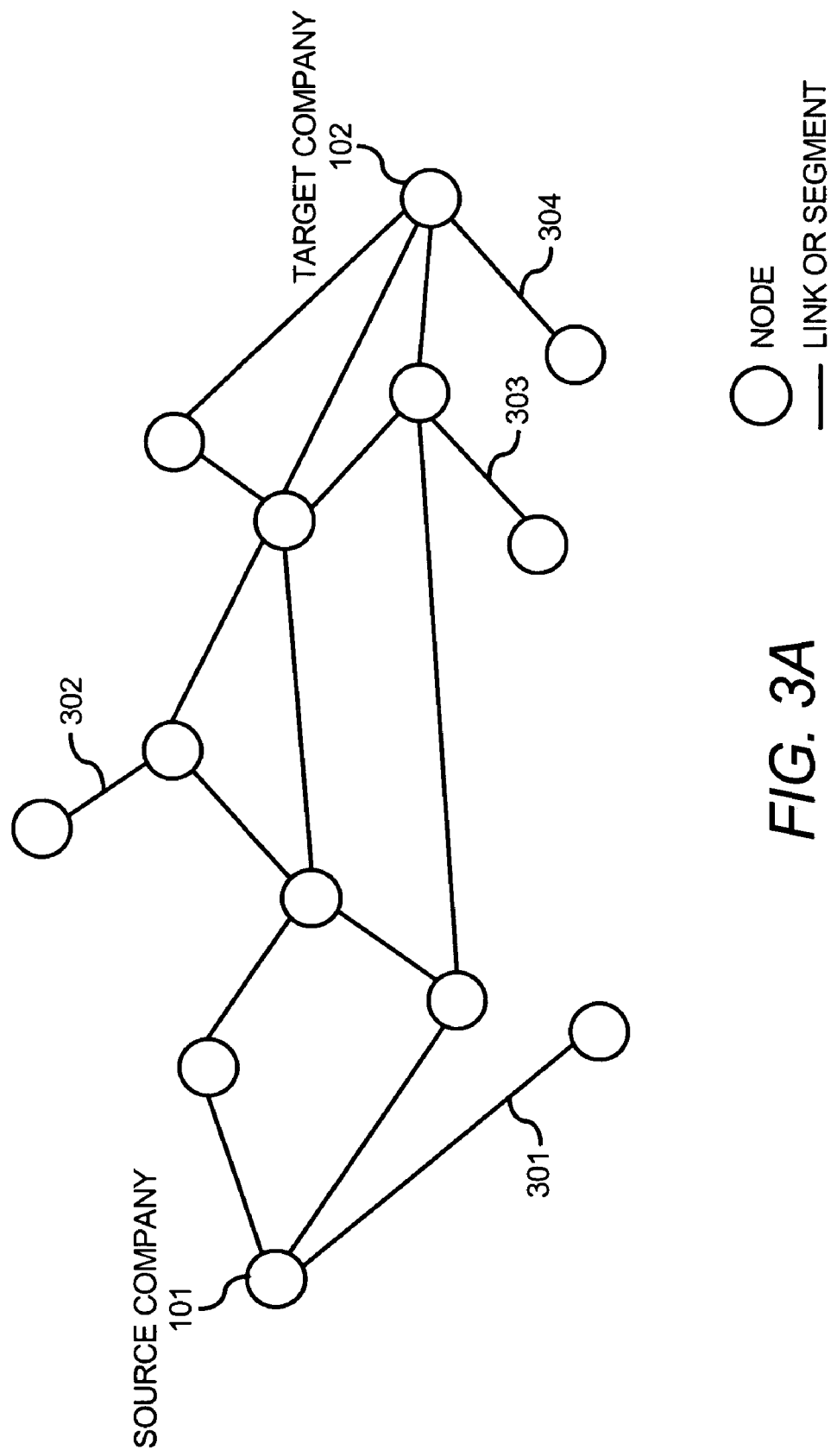
FIGS. 3A-D illustrate examples of indirect business relationships in a business relationship network and matching link attributes to create navigable paths for the business relationship network, according to an embodiment.
Figure 3B:
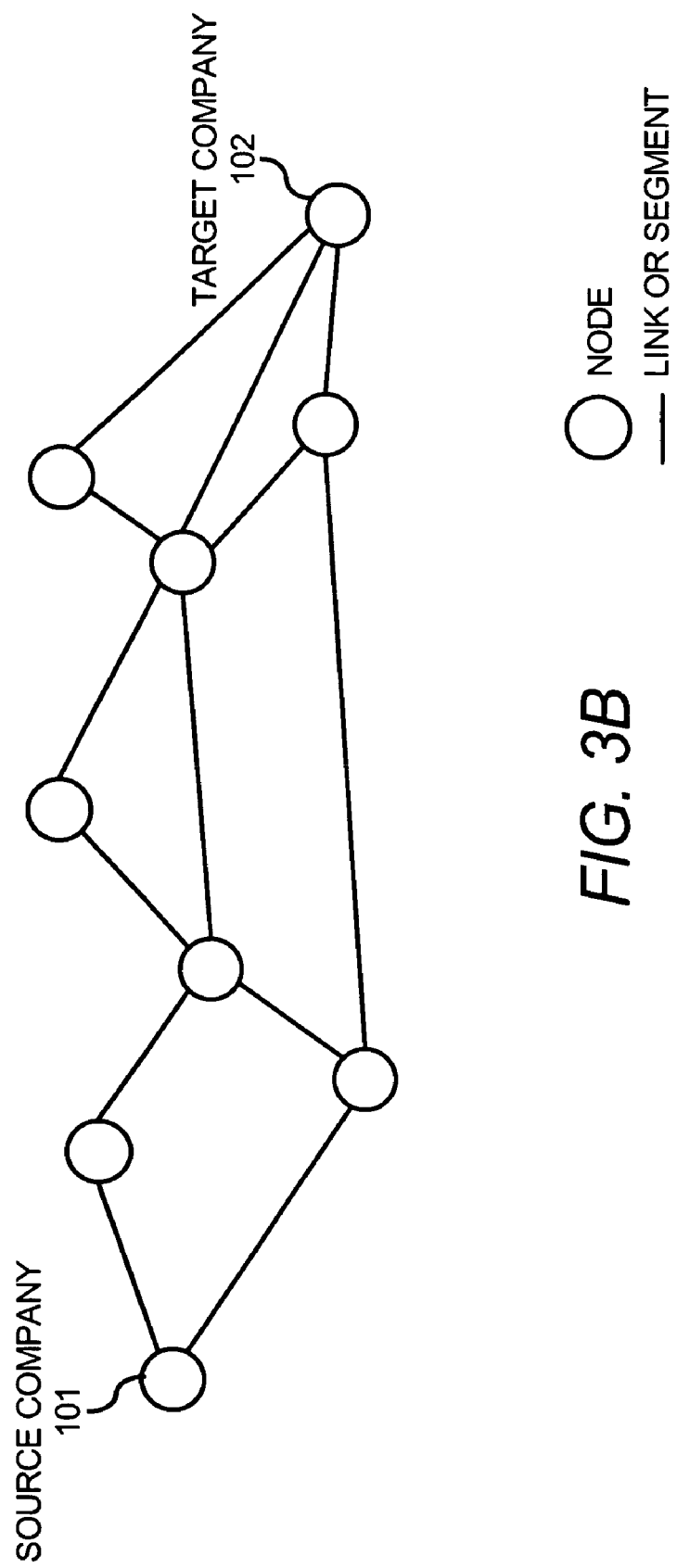
Figure 3C:
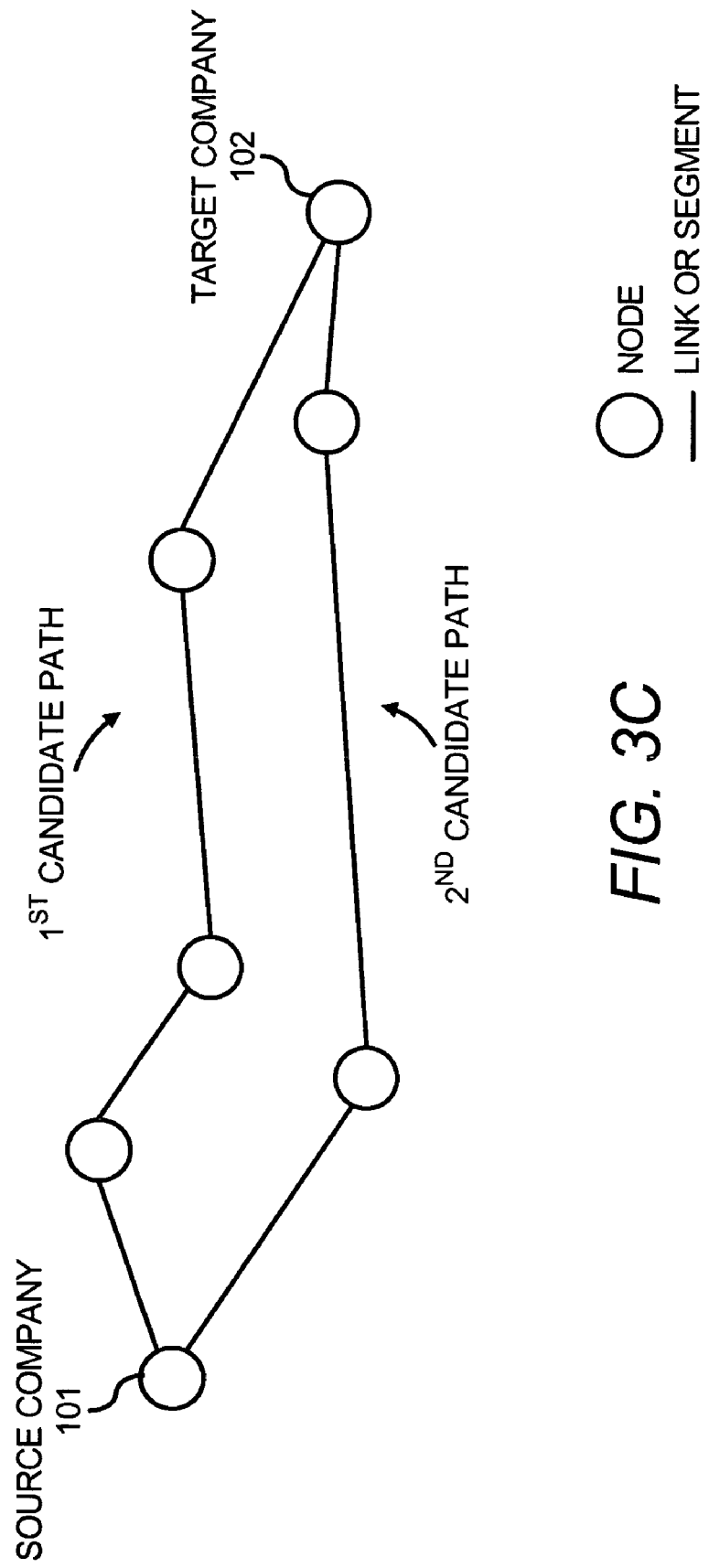

The business relationship prospector 110 generates navigable paths in a business relationship network from the collective knowledge set of business relationship information gathered from a plurality of sources, including the source company 101. FIG. 3A illustrates an example of all the nodes and links generated from the collective knowledge set by the business relationship prospector 110 for a business relationship network. Some of the links do not form complete navigable paths between the source company 101 and the target company 102. For example, links 301-304 are not included in any complete navigable paths between the source company 101 and the target company 102. The business relationship prospector 110 removes links 301-304 from the business relationship network, such as shown in FIG. 3B. FIG. 3B shows multiple, complete, navigable paths between the source company 101 and the target company 102. The business relationship prospector 110 identifies one or more of the navigable paths shown in FIG. 3B as candidate paths most likely to lead to a business relationship between the source company 101 and the target company 102 based on evaluation criteria, and the candidate paths are shown in FIG. 3C.

Figure 3D:
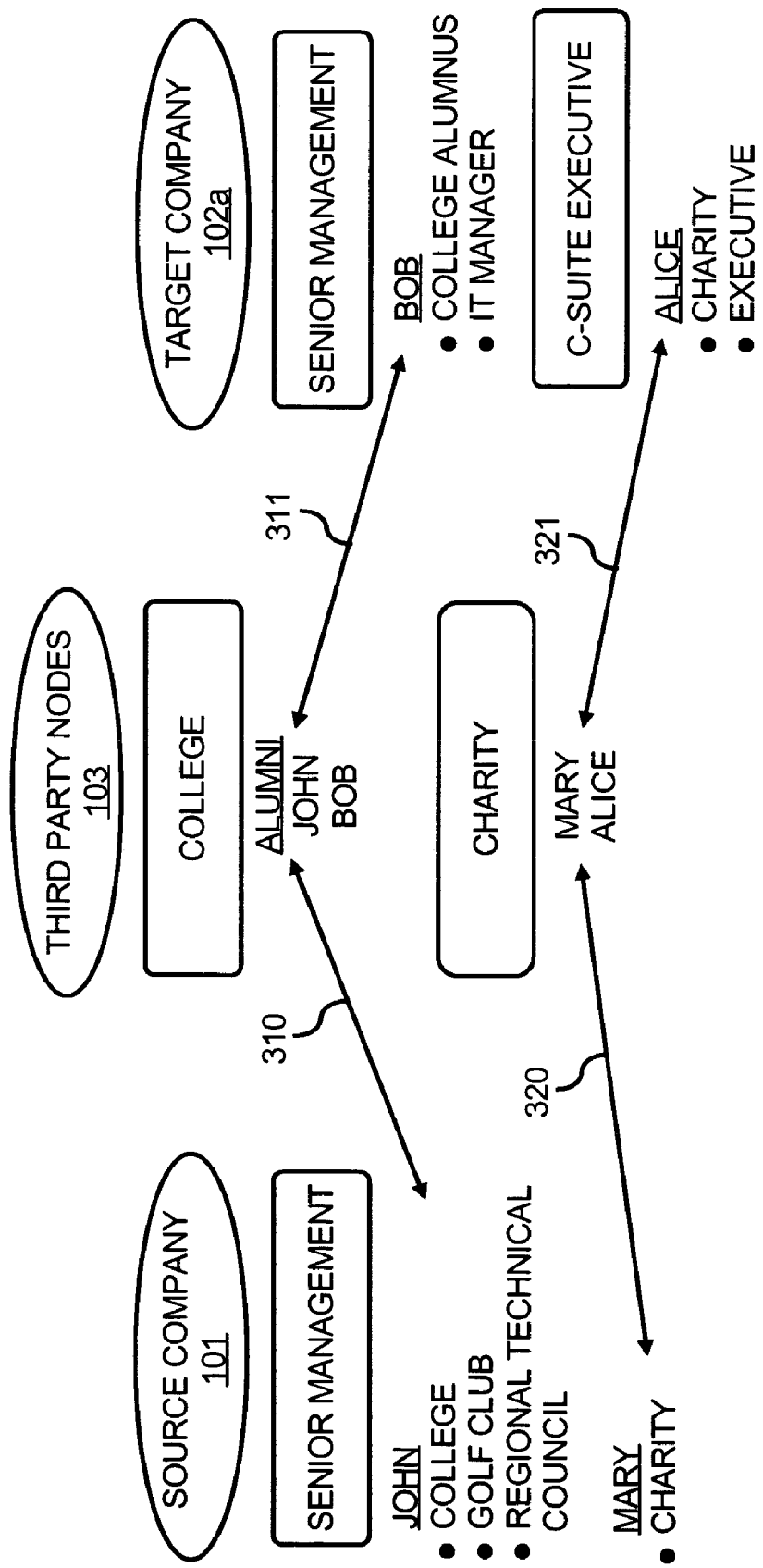

FIG. 3D shows a more detailed example of a business relationship network between the source company 101 and the target company 102. In particular, FIG. 3D shows an example of using link attributes to create navigable paths between the source company 101 and the target company 102.

The employees and their link attributes for the source company 101, for example, include senior management employees, such as John and Mary shown in FIG. 3. Also shown are link attributes for John and Mary. For example, the link attributes for John includes a college from which John graduated, a golf club of which John is a member, and a regional technical counsel of which John is a member. The link attributes for Mary include a charity of which Mary is a board member.

Also, as shown in FIG. 3, the third party node 103a, for example, is John's college, and the third party node 103b is Mary's charity. The target company 102a is also shown and employees Bob and Alice for the target company 102a are shown. For example, Bob is senior management for the target company 102a and Alice is a C-suite executive for the target company 102a. Employee profiles for Bob and Alice include link attributes for Bob and Alice. The global searches may have identified Bob as an IT manager at the target company 102a. For example, Bob may have been quoted in an article mentioning his name, title, and that he works for the target company 102a. The search tool 212 retrieved the article and stored the article in the relationship database 112. The article may have been manually or electronically reviewed to identify Bob and link attributes for Bob. A global search may also have retrieved a list of alumni for John's college from the college's website. Bob is also a graduate from that college. The relationship finder module 211 generates and stores the profile for Bob. Thus, Bob's profile indicates that Bob is an IT manager at the target company 102a and graduated from John's college. A global search may have identified Alice as a C-suite executive at the target company 102b. Also, a global search may have retrieved a list of board members for Mary's charity, and Alice is also a board member of the charity. This information is stored in Alice's profile.

The relationship finder module 211 of the business relationship prospector 110 shown in FIG. 2 is operable to map the business relationship information for the source company 101, the third party nodes 103a-b and the target company 102a as a plurality of navigable paths to form the business relationship network between the source company 101 and the target company 102a. For example, the relationship finder module 211 matches link attributes for the source company 101, the third party nodes 103a-b and the target company 102a to determine the links 310-311 and 320-321 that form the navigable paths for the business relationship network. In particular, the links 310-311 and the third party node 103a form the navigable path between the source company 101 and the target company 102a, and the links 320-321 and the third party node 103b form another navigable path between the source company 101 and the target company 102a.

In one embodiment, the relationship finder module 211 shown in FIG. 2 searches the data store 202 for the matching link attributes between the source company 101 and the target companies 102a-c. For example, the relationship finder module 202 identifies John and Bob as being alumni of the same college, shown as the third party node 103a and the links 310-311. The relationship finder module 202 also identifies Mary and Alice as being board members of the same charity, shown as third party node 103b and links 320-321 linking Mary to Alice via the third party node 103b.

FIG. 4 shows a refined data set 400 which may be generated by the business relationship finder module 211 to map the navigable paths. For example, an entry 401 is created in the refined data set 400 for a navigable path between John and Bob. The entry 401 identifies John from the source company 101, Bob from the target company 102a, link attributes for John and Bob, and any matching link attributes for an indirect relationship. For Bob and John, the matching link attribute is alumni of the same college, which is the third party node 103a in this example. An entry 402 is created for a navigable path between Mary and Alice. The entry 402 identifies Mary from the source company 101, Alice from the target company 102b, link attributes for Mary and Alice, and any matching link attributes for an indirect relationship. For Mary and Alice, the matching link attribute is being a board member of the same charity, which is the third party node 103b in this example.

It will be apparent to one of ordinary skill in the art that the business relationship prospector 210 may identify navigable paths for direct business relationships also. In addition, depending on the amount and quality of business relationship information collected for the source company 101 and the target company 102a, many more navigable paths may be identified for the business relationship network.

The business relationship prospector 210 is also operable to identify one or more candidate paths most likely to lead to a business relationship based on the evaluation criteria 241. For example, navigable paths in the top two tiers may be considered candidate paths or navigable paths with only senior management or C-suite executives are selected in the evaluation criteria. In another example, direct navigable paths and navigable paths having third party nodes with high target participation are selected as candidate paths or navigable paths with n-degrees of separation where "n" is less than or equal to a threshold. It will be apparent to one of ordinary skill in the art that other criteria from the evaluation criteria 241 may be used to select candidate paths. Also, the business network visualization may include only the candidate paths or may include some or all of the navigable paths.

FIGS. 5A-D illustrate examples of business network visualizations for a business relationship network. FIGS. 5A-D also show different layers of the business relationship network wherein the top layer may represent an overall view of the business relationship network and the lower layers show portions of the business relationship network.

Figure 5A:
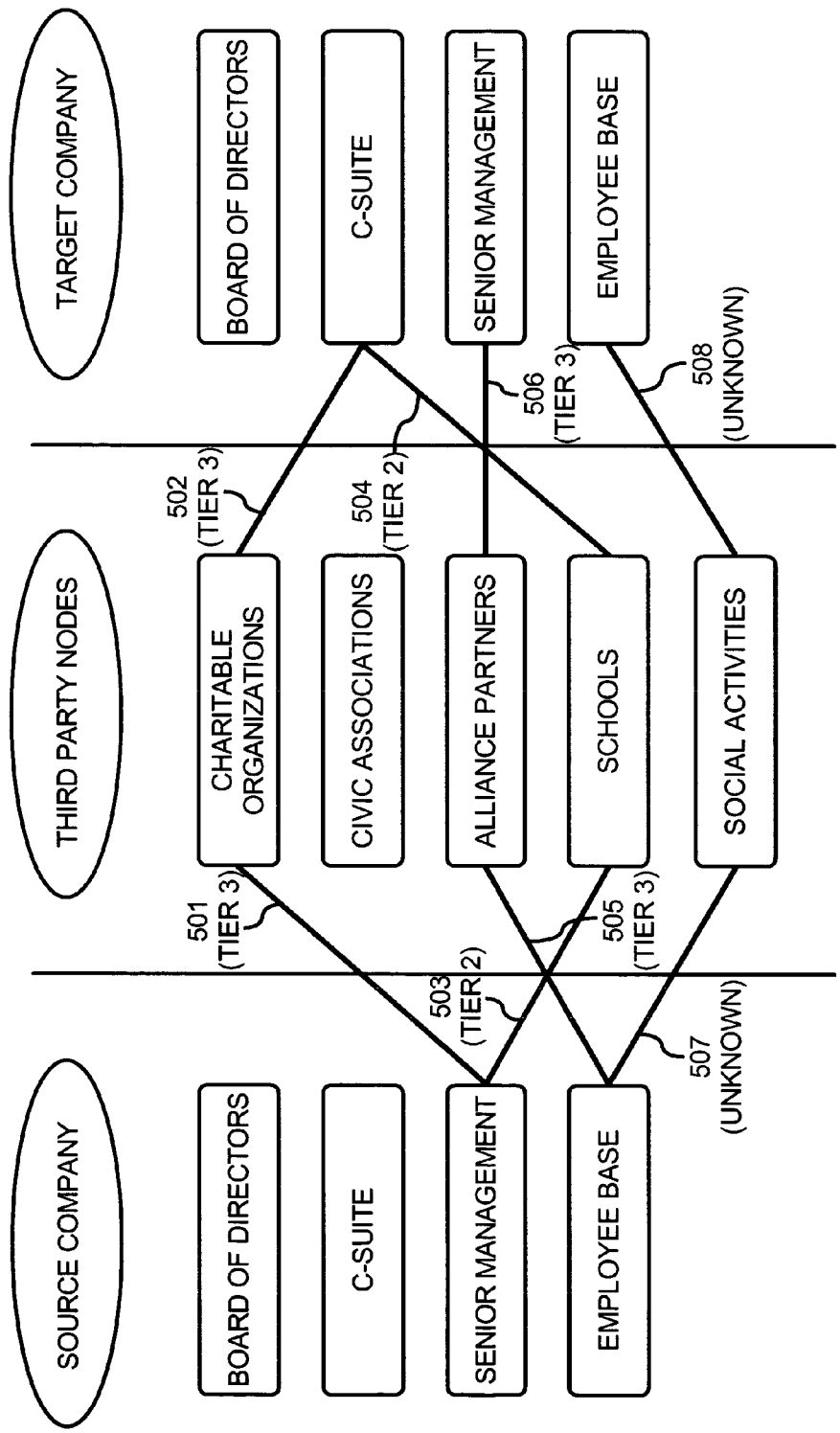
FIGS. 5A-D illustrates examples of business network visualizations, according to embodiments.

FIG. 5A is the top layer and illustrates navigable paths and tiers assigned to the navigable paths. The links 501 and 502 and the charitable organizations form a tier 3 navigable path. Assume that tier 3 is the highest tier representing a navigable path most likely to lead to a business relationship between the source company and the target company. For example, this navigable path is a tier 3 path because the evaluation criteria 241 shown in FIG. 2 indicate that the charitable organizations have been used multiple times in previously-generated business relationship networks to generate successful business relationships and that C-Suite executives in the target company 101 are individuals that are likely to make purchase decisions or influence purchase decisions. These evaluation criteria may be generated by the feedback module 214 shown in FIG. 2 analyzing the success and failures of navigable paths in past business relationship networks.

Links 503-504 and the schools shown in FIG. 5A form a tier 2 path. For example, the evaluation criteria 241 shown in FIG. 2 indicate that the schools are moderately successful in generating business relationships, so this path is a tier 2.

Links 505-506 and the alliance partners shown in FIG. 5A form a tier 3 path. For example, the evaluation criteria 241 shown in FIG. 2 indicate that the alliance partners are less than moderately successful in generating business relationships so this path is a tier 1.

Links 507-508 and the social activities third party node shown in FIG. 5A also form a navigable path. However, there may not be sufficient data on the social activities third party node and/or the employee in the employee base of the target company to assign a tier to this path. Thus, this navigable path may be labeled unknown.

Figure 5B:
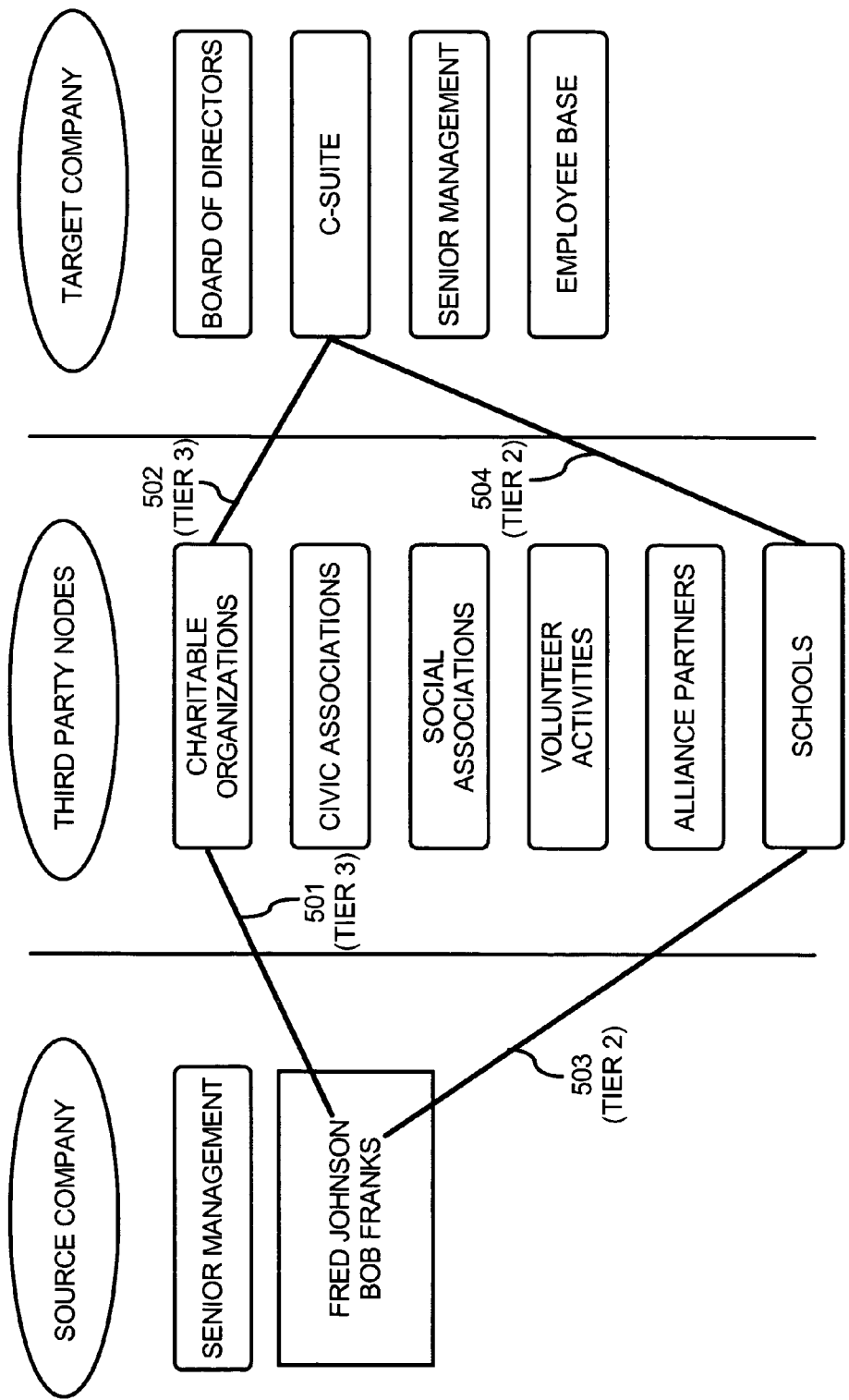

FIG. 5B shows a lower layer to the top layer of the business relationship network shown in FIG. 5A. For example, the senior management of the source company includes Bob Franks and Fred Johnson. The visual representation shown in FIG. 5B also shows the navigable paths for Bob Franks and Fred Johnson of the senior management of the source company. The visual representation shown in FIG. 5B may have been generated in response to the user selecting senior management and then the drop-down menu for the senior management listing Bob Franks and Fred Johnson is shown to provide more detail on those endpoints of the navigable paths. Other navigable paths from the top layer may not be shown so the user can focus on the navigable paths for the senior management of the source company.

Figure 5C:
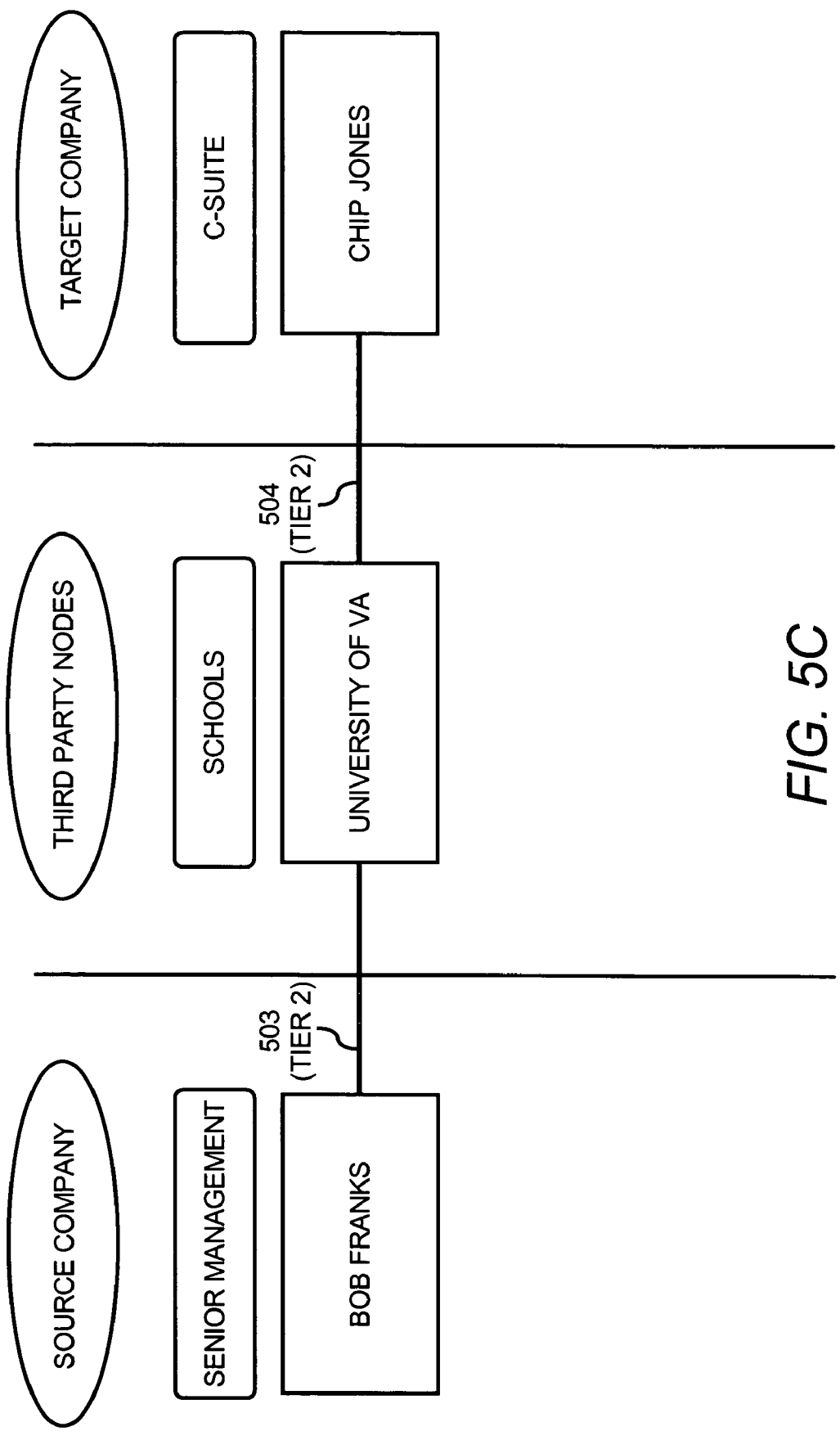

FIG. 5C shows a lower layer to the layer of the business relationship network shown in FIG. 5B. For example, a user desires to focus on the navigable path including the links 503-504 and the schools third party node. The visual representation shown in FIG. 5C provides more detail on the schools third party node. For example, University of Virginia is the third party node connecting Bob Franks with a C-suite executive of the target company. The visual representation shown in FIG. 5C may have been generated in response to the user selecting the schools third party node and then a drop-down menu for the schools lists University of Virginia as the third party node connecting Bob Franks with a C-suite executive of the target company.

Figure 5D:
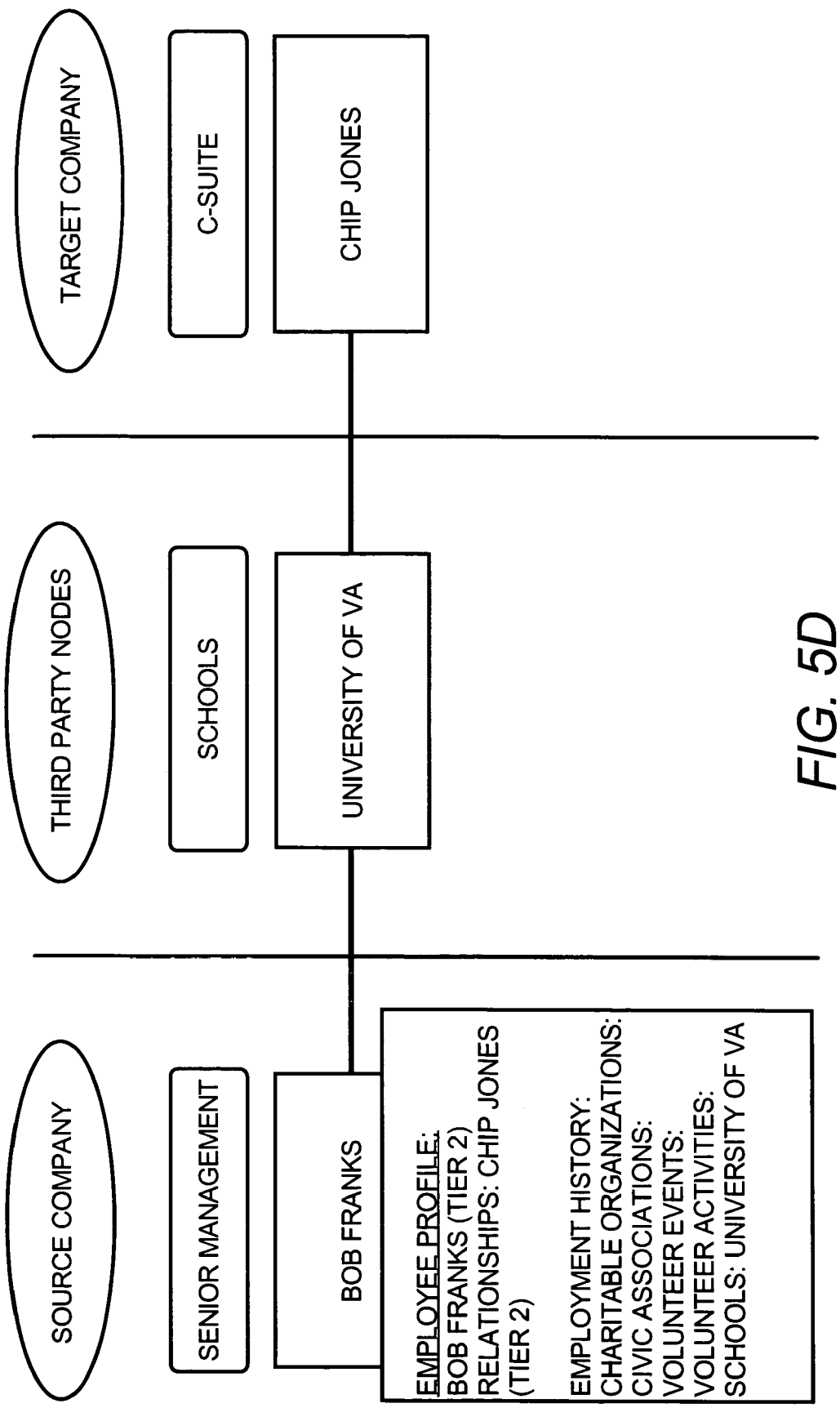

FIG. 5D shows the employee profile of Bob Franks. For example, the employee profile lists the tier rating for Bob Franks or link including Bob Franks as Tier 2 based on evaluation criteria developed from feedback. The employee profile also lists the target nodes connected to Bob Franks via a navigable path and their respective tiers. In this example, Chip Jones or link including Chip Jones is tier 2 based on evaluation criteria developed from feedback. The employee profile also lists the link attributes for Bob Franks, such as employment history, charitable organizations, civic associations, business associations, volunteer events, volunteer activities, and schools. This list is not exhaustive, and more link attributes may be provided in the employee profile. Also, less link attributes may be provided in employee profiles. Also, values for the link attributes, such as schools that Bob Franks graduated from or associations that Bob Franks is a member of may or may not be determined and shown in the profile depending on the business relationship information collected for Bob Franks from the data sources 220.

FIGS. 5A-D illustrate examples of different layers that may be shown as visualizations of the business relationship network, ranging from a comprehensive layer shown n FIG. 5A to a layer providing detailed node information, such as the employee profile shown in FIG. 5D.

Figure 6:
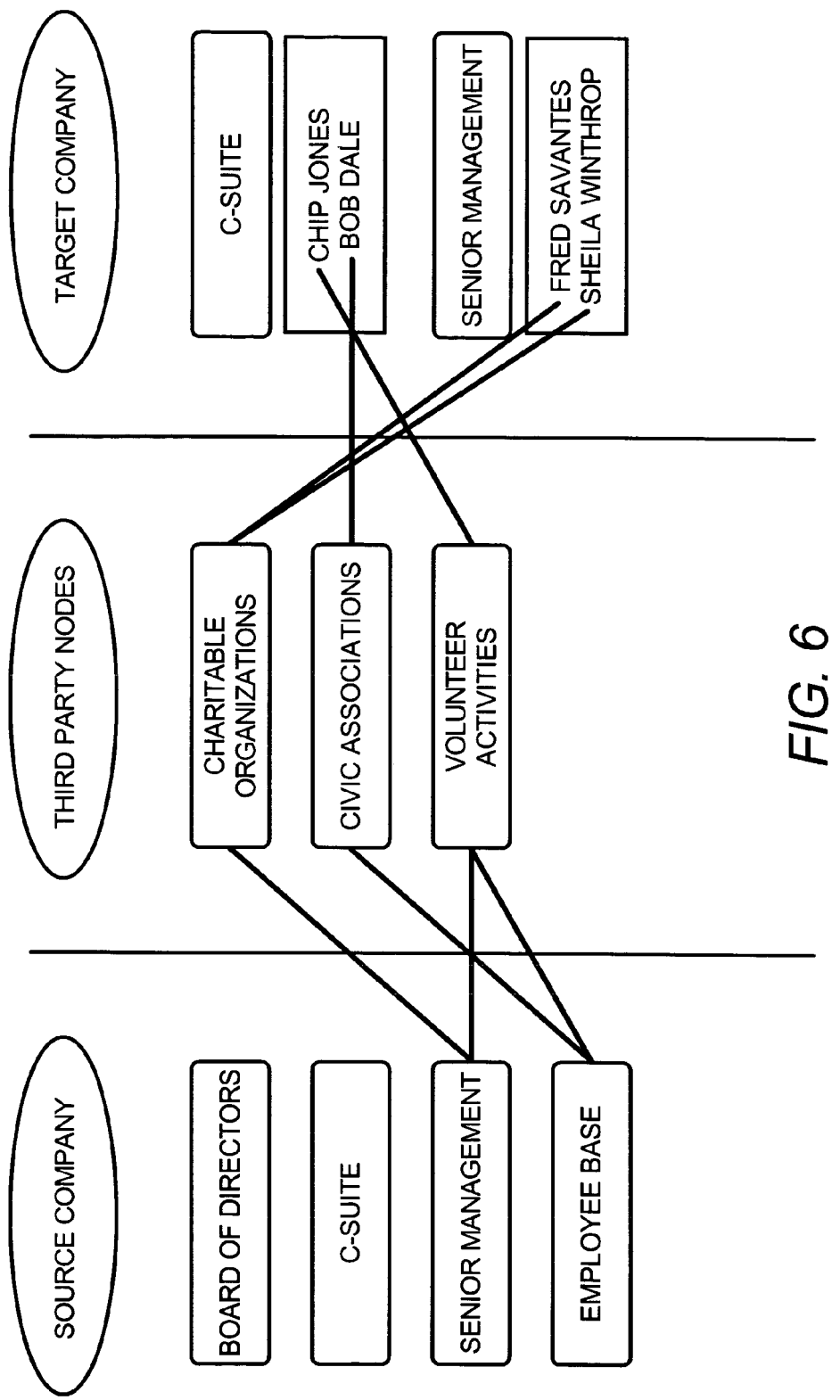
FIG. 6 illustrates an example of a business network visualization including third party nodes having high target participation, according to an embodiment.

FIG. 6 illustrates an example of a business network relationship visualization including third party nodes determined to have high target participation. For example, from the business relationship information collected from the data sources 120, the business relationship prospector 110 determines that the target company has employees that are active members of the charitable organizations, the civic associations and the social associations. Also, the active members may be employees likely to make or influence purchase decisions. Thus, these third party nodes are determined to be high target participation third party nodes. A user may use this visual representation to quickly identify third party nodes to join or become an active member thereof to possibly generate a business relationship. Although not shown, a visual representation may also be provided to identify low-participation third party nodes or third-party nodes that have been unsuccessful for generating business relationships. The source company may avoid those nodes when attempting to generate a business relationship or when determining where to allocate resources for business development.

In another embodiment, the links connecting the high-participation third party nodes may not be shown, so a user may quickly identify the high-participation third party nodes. A list of the high-participation third party nodes may also be provided.

Figure 7:
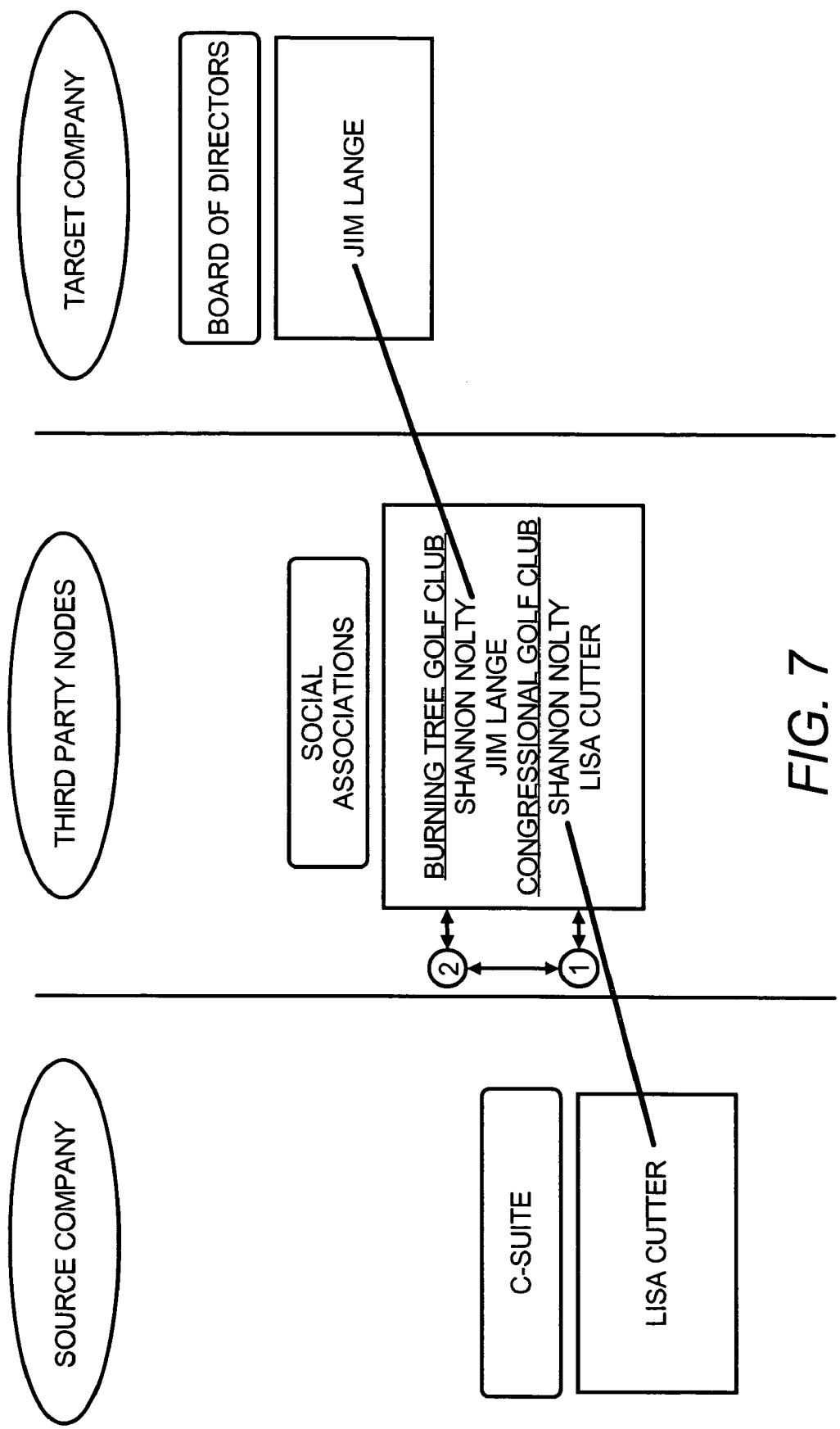
FIG. 7 illustrates an example of a business network visualization showing n-degrees of separation, according to an embodiment.

A navigable path in a business relationship may be complex and may include more than a single third party node between a source and a target. FIG. 7 illustrates an example of a business network visualization showing n-degrees of separation for a navigable path. In this example, there are 2-degrees of separation between Lisa Cutter, a C-suite executive of the source company, and Jim Lange, a board member of the target company. For example, both Lisa Cutter and Shannon Nolty are members of the Congressional Golf Club. Shannon Nolty and Jim Lange are members of the Burning Tree Golf Club. Lisa Cutter is connected to Jim Lange via Shannon Nolty being a member of the Congressional Golf Club and Shannon Nolty being a member of the Burning Tree Golf Club.

In addition to showing the n-degrees of separation, FIG. 7 shows that the business relationship prospector 110 is operable to identify and connect different node layers. For example, a social association is a type of third party node, and golf clubs are types of social associations. In this example, specific golf clubs and their memberships are identified to link the source company and the target company.

It will be apparent to one of ordinary skill in the art that multiple types of third party nodes, such as social associations and civic associations, may be used to create a navigable path with n-degrees of separation. In addition, it will be apparent to one of ordinary skill in the art that the visual representations shown in FIGS. 5A-D, 6 and 7 may include multiple targets and may show direct business relationships. Furthermore, navigable paths may include more than one or two degrees of separation.

Figure 8:
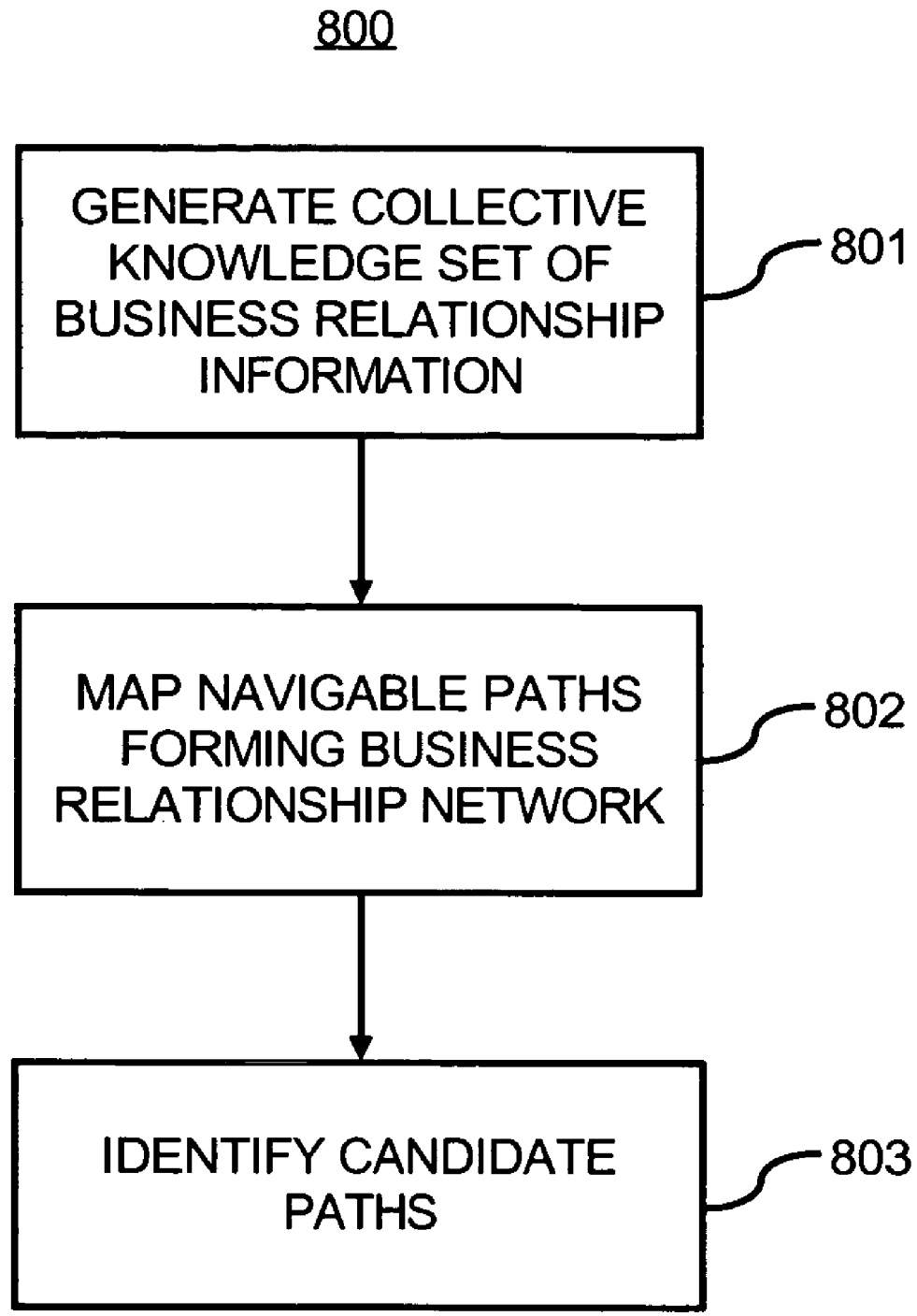
FIG. 8 illustrates a flowchart of a method for determining a business relationship network, according to an embodiment.

FIG. 8 illustrates a flow chart of a method 800 for determining a business relationship network, according to an embodiment. The method 800 is described with respect to FIG. 2 by way of example and not limitation. The method 800 may be used with other systems.

At step 801, the business relationship prospector 110 shown in FIG. 2 generates a collective knowledge set of business relationship information from the data sources 120. In one embodiment, generating a collective knowledge set may include the business relationship prospector 110 guiding the search tool to perform global searches of the data sources 220 to collect business relationship information for one or more sources, one or more third party nodes and one or more targets. In another embodiment, generating a collective knowledge set may include receiving data from a plurality of sources and/or organizing the received data. Organizing may include storing the data in a format such that the data can be searched and search results retrieved, such as storing received data in a database. Received data may be converted to a format that is searchable. This may include classifying data in different categories and storing the classified data so it may be searched for generating profiles. Classification may be performed manually and/or automatically using machine-learning classifiers or other known machine-learning technology.

At step 802, the business relationship prospector 110 maps the collective knowledge set as navigable paths forming a business relationship network between a source and a target. For example, the business relationship prospector 110 matches link attributes of the source, the target and third party nodes to form navigable paths for a business relationship network between the source and the target. The link attributes may be determined from the business relationship information collected from the data sources 220.

At step 803, the business relationship prospector 110 identifies one or more navigable paths as candidate paths most likely to lead to a business relationship between the source and the target based on the evaluation criteria 241. Examples of evaluation criteria may include whether a navigable path includes a third party node that was successfully used to generate a business relationship, whether the value of "n" for n-degrees of separation is less than or equal to a predetermined threshold, whether the navigable path includes a key-decision maker or a C-suite executive, etc. The navigable paths may be classified in tiers based on the evaluation criteria. For example, paths in the highest tier may be candidate paths. The feedback module 214 may be used to determine some of the evaluation criteria 241 used to identify candidate paths and classify navigable paths to tiers. The candidate paths may be provided to a user, for example, via a display or other output, such that the user can select one or more of the candidate paths for forming a business relationship with the target. The weights or tiers of each candidate path may also be presented or the list of candidate paths may be ordered to aid in the selection.

After the business relationship network is generated and the candidate paths are identified, a user may use one or more of the candidate paths to form a business relationship with the target. Using the candidate paths may include forming relationships with each node or otherwise using each node in a candidate path to form a business relationship with the target. For example, the user may contact a node in a candidate path to request a meeting with a next node in the path until the target is contacted.

The method 800 may be used to provide a service to a client. The client may be a user or entity that desires to have the service performed for forming a business relationship network for the client. The service may include performing the steps of the method 800 to identify candidate paths that the client may follow to form a business relationship with a target. Also, the client may be presented with a plurality of candidate paths such that the client can select one or more of the candidate paths to develop a business relationship with the target.

Figure 9:
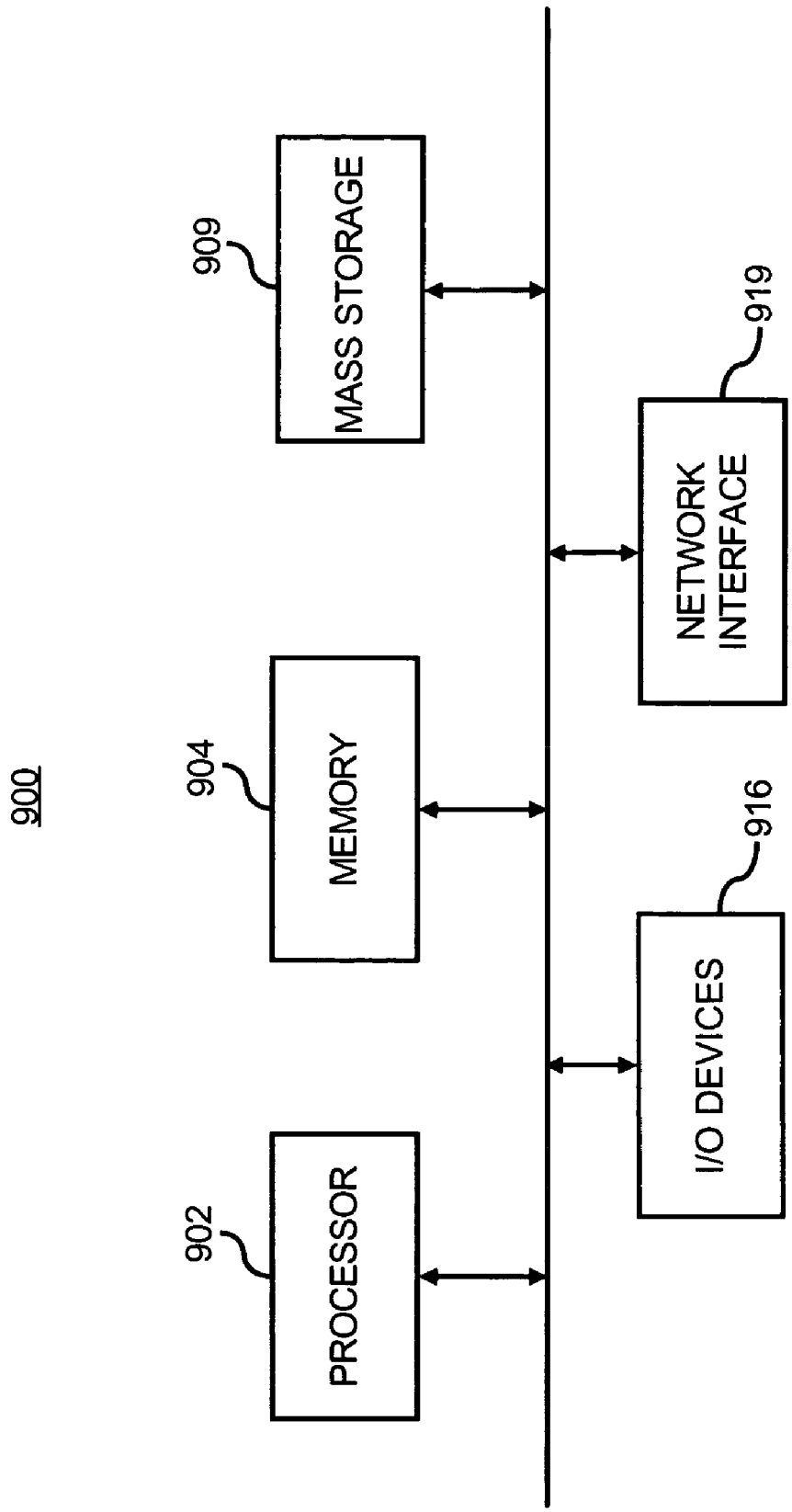
FIG. 9 illustrates a block diagram of a computer system in which one or more of the embodiments may be implemented.

FIG. 9 illustrates an exemplary block diagram of a computer system 900 that includes one or more processors, such as processor 902, providing an execution platform for executing software, for example, including at least some of the steps illustrated in the method 800 and other steps described herein. The software may also include the modules described in FIG. 2. The processor 902 may also execute an operating system (not shown) for executing the software in addition to performing operating system tasks. The computer system 900 also includes a main memory 904, such as a Random Access Memory (RAM), where software may be resident during runtime, and mass storage 909. The mass storage 909 may include one or more hard disk drives and/or a removable storage drive. Applications and resources may be stored in the mass storage 909 and transferred to the main memory 904 during run time. The mass storage 909 may also include ROM (read only memory), EPROM (erasable, programmable ROM), EEPROM (electrically erasable, programmable ROM). Components of the computer system 900 may communicate via a bus 909.

A network interface 919 is provided for communicating with other computer systems. For example, the business relationship prospector 110 shown in FIGS. 1 and 2 may communicate with the source company 101 and a user through a network using the network interface 919. The user interface 202 shown in FIG. 2 may be provided using I/O devices 916, such as a display, keyboard, mouse, etc. The computer system 900 is a simplified example of a platform. It will be apparent to one of ordinary skill in the art that the other components may be added or components may be removed as needed.

One or more of the steps of the method 800 and other steps described herein and software described herein may be implemented as software embedded or stored on a computer readable medium, such as the main memory 904 or the mass storage 909, and executed by the processor 902. The steps may be embodied by a computer program, which may exist in a variety of forms both active and inactive. For example, there may exist as software program(s) comprised of program instructions in source code, object code, executable code or other formats for performing some of the steps when executed. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

What has been described and illustrated herein are examples of the systems and methods described herein along with some of their variations. The terms, descriptions and figures used herein are set forth by way of illustration only and are not meant as limitations. Those skilled in the art will recognize that many variations are possible within the spirit and scope of these examples, which intended to be defined by the following claims and their equivalents in which all terms are meant in their broadest reasonable sense unless otherwise indicated.

What is claimed is:

1. A method of automatically determining and evaluating a business relationship network for forming business relationships, the method comprising:
    generating a collective knowledge set of business relationship information from a plurality of sources;
    mapping the collective knowledge set as a plurality of navigable paths forming a business relationship network between a source and a target, each navigable path of the plurality of navigable paths comprising nodes and links between at least some of the nodes;
    analyzing feedback including stored historical information of successes and failures in generating business relationships of prior navigable paths from previously-generated business relationship networks;
    determining evaluation criteria from the feedback and the mapping, wherein the determining of evaluation criteria includes:
        determining that a value of "n" for n-degrees of separation between the source and the target for each of the plurality of navigable paths is less than or equal to a predetermined threshold;
        assigning, based on attributes of each node, a tier value for each link in each of the plurality of navigable paths, resulting in a plurality of tier values; and
        assigning each of the plurality of navigable paths to one of the plurality of tier values representing a lowest tier valued link in the respective navigable path, wherein the lowest tier valued link is least likely of all links in the respective navigable path to lead to a business relationship between the source and the target; and
    identifying, by a processor of a computer system, based on the determined evaluation criteria, a subset of the plurality of navigable paths as candidate paths mapped from the collective knowledge set to generate a business relationship between the source and the target.

2. The method of claim 1, where the plurality of navigable paths comprise paths between the source and the target and one or more of the plurality of navigable paths include multiple third party nodes.

3. The method of claim 1, further comprising:
determining business guidance points from the feedback; and
notifying a user of the business guidance points, such that the user is able to follow the business guidance points to further a business objective.

4. The method of claim 3, wherein the business guidance points comprise high target participation third party nodes or third party nodes that have been successful or unsuccessful for generating business relationships.

5. The method of claim 3, wherein the business guidance points comprise instructing the user that a predetermined number of navigable paths are to be followed to achieve at least a predetermined probability of success for generating a business relationship with the target.

6. The method of claim 1, further comprising:
determining a business objective; and
using the feedback to develop at least some of the evaluation criteria to achieve the business objective.

7. The method of claim 1,
wherein the tier of each candidate path is representative of an ability to satisfy a business objective using the candidate path.

8. The method of claim 1, further comprising:
updating the evaluation criteria based on analysis of new feedback.

9. The method of claim 1, further comprising:
using the feedback to determine types of data to be collected for the collective knowledge set, such that the collected data includes data most likely to lead to a business relationship between the source and the target.

10. The method of claim 1, further comprising:
using the feedback to determine whether to add or remove one or more of the plurality of sources for the collective knowledge set.

11. The method of claim 1, wherein mapping the collective knowledge set as a plurality of navigable paths forming a business relationship network between a source and a target further comprises:
identifying third party nodes associated with the source and the target from the collective data set; and
determining the plurality of navigable paths between the source and the target, such that at least some of the navigable paths include one or more of the third party nodes.

12. The method of claim 11, wherein determining the plurality of navigable paths between the source and the target further comprises:
determining link attributes for the source and the target, wherein the link attributes describe the source and the target;
searching the collective knowledge set for nodes having link attributes matching one or more of the link attributes of the source or the target, wherein the searched nodes having link attributes matching the one or more link attributes of the source or the target are the third party nodes;
creating links between the third party nodes and the source or the target based on the matching; and
forming the plurality of navigable paths from the created links.

13. The method of claim 1, further comprising:
generating a visualization of the business relationship network including the plurality of navigable paths.

14. The method of claim 13, wherein the visualization shows n-degrees of separation for the plurality of navigable paths representing indirect business relationships.

15. The method of claim 13, wherein the visualization shows profiles for at least one of the source, the third party node, and the destination in at least one of the plurality of navigable paths.

16. The method of claim 13, wherein the visualization comprises a plurality of visualizations representing the business relationship network, wherein each of the plurality of visualizations represents a layer of the business relationship network.

17. The method of claim 13, wherein the visualization shows high target participant third party nodes.

18. The method of claim 1, wherein the plurality of sources comprises at least one of internal structured data, internal unstructured data, external structured data, and external unstructured data.

19. A computer system to determine and evaluate a business relationship network for forming business relationships, the computer system comprising:
data storage to store a collective knowledge set of business relationship information gathered from a plurality of sources, including historical information on successes and failures of using previously-generated business relationship networks to develop a business relationship;
a processor; and
a business relationship prospector comprising:
a visualization module to map the collective knowledge set as a plurality of navigable paths forming the business relationship network between a source and a target, wherein at least one of the navigable paths includes a third party node and each of the plurality of navigable paths comprising nodes and links between at least some of the nodes;
a feedback module to generate and analyze feedback, the feedback including the stored historical information of successes and failures in generating business relationships of prior navigable paths from previously-generated business relationship networks; and
a relationship finder module to:
determine evaluation criteria from the feedback and the mapping, wherein the relationship finder module is to:
determine that a value of "n" for n-degrees of separation between the source and the target for each of the plurality of navigable paths is less than or equal to a predetermined threshold;
assign, based on attributes of each node, a tier value for each link in each of the plurality of navigable paths, resulting in a plurality of tier values; and
assign each of the plurality of navigable paths to one of the plurality of tier values representing a lowest tier valued link in the respective navigable path, wherein the lowest tier valued link is least likely of all links in the respective navigable path to lead to a business relationship between the source and the target; and
identify, based on the determined evaluation criteria, a subset of the plurality of navigable paths as candidate paths mapped from the collective knowledge set to generate a business relationship between the source and the target.

20. The computer system of claim 19, wherein the relationship finder module is further to guide a search tool for collecting the knowledge set and perform the mapping of the collective knowledge set as the plurality of navigable paths forming the business relationship network.

21. The computer system of claim 19, wherein the business relationship prospector is further to determine business guidance points from analysis of the feedback, and notify a user of the business guidance points, such that the user is operable to use the business guidance points to further a business objective.

22. The computer system of claim 19, wherein the tier of each candidate path is representative of an ability to satisfy a business objective using the candidate path.

23. The computer system of claim 19, wherein the visualization module is further to determine at least one visual representation of the business relationship network showing the navigable paths.

24. The computer system of claim 19, wherein the relationship finder module is further to determine the plurality of navigable paths by:
    determining link attributes for the source and the target describing the source and the target;
    searching the collective knowledge set for nodes having link attributes matching one or more of the link attributes of the source or the target, wherein the searched nodes having link attributes matching the one or more link attributes of the source or the target are third party nodes;
    creating links between the third party nodes and the source or the target based on the matching; and
    forming the plurality of navigable paths from the created links.

25. A computer program embedded on a non-transitory computer readable storage medium, the computer program including instructions that when executed by a processor implement a method comprising:
    generating a collective knowledge set of business relationship information from a plurality of sources;
    mapping the collective knowledge set as a plurality of navigable paths forming a business relationship network between a source and a target, each navigable path of the plurality of navigable paths comprising nodes and links between at least some of the nodes;
    analyzing feedback including stored historical information of successes and failures in generating business relationships of prior navigable paths from previously-generated business relationship networks;
    determining evaluation criteria from the feedback and the mapping, wherein the determining of evaluation criteria includes:
        determining that a value of "n" for n-degrees of separation between the source and the target for each of the plurality of navigable paths is less than or equal to a predetermined threshold;
        assigning, based on attributes of each node, a tier value for each link in each of the plurality of navigable paths, resulting in a plurality of tier values; and
        assigning each of the plurality of navigable paths to one of the plurality of tier values representing a lowest tier valued link in the respective navigable path, wherein the lowest tier valued link is least likely of all links in the respective navigable path to lead to a business relationship between the source and the target; and
    identifying, by a processor of a computer system, based on the determined evaluation criteria, a subset of the plurality of navigable paths as candidate paths mapped from the collective knowledge set to generate a business relationship between the source and the target.

26. The computer program embedded on a computer readable storage medium of claim 25, wherein the plurality of navigable paths comprise paths between the source and the target and one or more of the paths include multiple third party nodes.

27. The computer program embedded on a computer readable storage medium of claim 25, wherein the method further comprises:
    determining business guidance points from the feedback; and
    notifying a user of the business guidance points, such that the user is operable to follow the business guidance points to further a business objective.

28. The computer program embedded on a computer readable storage medium of claim 25, wherein the method further comprises:
    using the feedback to develop at least some of the evaluation criteria to achieve a business objective.

29. The computer program embedded on a computer readable storage medium of claim 28,
    wherein the tier of each candidate path is representative of an ability to satisfy a business objective using the candidate path.

30. The computer program embedded on a computer readable storage medium of claim 25, wherein mapping the collective knowledge set as a plurality of navigable further comprises:
    determining link attributes for the source and the target, wherein the link attributes describe the source and the target;
    searching the collective knowledge set for nodes having link attributes matching one or more of the link attributes of the source or the target, wherein the searched nodes having link attributes matching the one or more link attributes of the source or the target are third party nodes;
    creating links between the third party nodes and the source or the target based on the matching; and
    forming the plurality of navigable paths from the created links.

* * * * *